United States Patent [19]

Eimer et al.

[11] Patent Number: 5,230,877
[45] Date of Patent: Jul. 27, 1993

[54] METHOD FOR REMOVAL OF AMMONIA FROM A GAS MIXTURE

[75] Inventors: Dag A. Eimer; Lars E. Øi, both of Porsgrunn, Norway

[73] Assignee: Norsk Hydro a.s, Oslo, Norway

[21] Appl. No.: 688,592

[22] PCT Filed: Feb. 2, 1990

[86] PCT No.: PCT/NO90/00028
§ 371 Date: Jun. 27, 1991
§ 102(e) Date: Jun. 27, 1991

[87] PCT Pub. No.: WO90/08736
PCT Pub. Date: Sep. 9, 1990

[30] Foreign Application Priority Data

Feb. 3, 1989 [NO] Norway ............................ 890439

[51] Int. Cl.$^5$ ............................................ C01C 1/04
[52] U.S. Cl. ........................................ 423/359; 55/37; 55/70
[58] Field of Search .................... 55/37, 70; 423/359

[56] References Cited

U.S. PATENT DOCUMENTS 4,149,857  4/1979  Volke et al. ............................ 55/70
4,793,829 12/1988  Pan et al. ............................... 55/70

FOREIGN PATENT DOCUMENTS 1924892 11/1969  Fed. Rep. of Germany .

Primary Examiner—Wayne Langel
Attorney, Agent, or Firm—Wenderoth, Lind & Ponack

[57] ABSTRACT

The present invention relates to a method of catalytic production of ammonia, where a gas mixture consisting mainly of unconverted synthesis gas, some ammonia, inert gases and possibly also water is recirculated to the synthesis reactor being first freed from the main part of the ammonia and possibly also water by absorption. The gas mixture is brought in contact with a hygroscopic abosrption agent having two or more OH-groups for absorption of ammonia and possibly also water. The absorption is carried out at a pressure being substantially the same as the ammonia synthesis pressure, and ammonia being desorbed from the absorption agent at a lower pressure and higher temperature than at the absorption. At least part of the possibly present water is removed from the absorption agent before it is supplied to the absorption column. Preferably it si applied ethylene glycol, diethylene glycol or triethylene glycol alone or in mixture as absorption agent. Possible water can be removed form the absorption agent by inert stripping gas before it is returned to the absorption column.

8 Claims, 3 Drawing Sheets

METHOD FOR REMOVAL OF AMMONIA FROM A GAS MIXTURE

BACKGROUND OF THE INVENTION

The present invention relates to a method for removal of ammonia from a gas mixture formed by catalytic production of ammonia. The gas mixture consists mainly of unconverted synthesis gas, some ammonia, inert gases and possibly also water. Ammonia and possibly also water are removed from the gas mixture by absorption with an organic absorption agent having two or more OH-groups, preferably a glycol.

Ammonia is produced by catalytic reaction between nitrogen and hydrogen. A commonly used synthesis pressure is about 200 bar. The conversion is not complete and unconverted synthesis gas has to be recirculated to the reactor. The ammonia formed must accordingly be separated from the gas mixture. Some ammonia can be recirculated. The problem is to remove as much of the ammonia as possible in an economical way, and it is especially important to have effective ammonia removal when the synthesis is carried out at relatively low pressure.

Another problem is the water which gets into the gas mixture from earlier stages in the process, especially the methanation stage. The water in the synthesis gas will deactivate the catalyst. Accordingly, it is desirable to remove as much as possible the water which might be present, before the gas reaches the synthesis reactor.

Ammonia can be removed from the gas mixture in several ways. The most used one, especially in high pressure units, is to remove the ammonia from the synthesis gas by condensation with cooling water. However, only part of the ammonia will be removed in each recirculating step. If lower synthesis pressure is used, a cooling unit requiring a high input of energy to its compressor is used, and the costs of apparatus utilized, for instance heat exchangers, will be high.

Another method which has been proposed is to wash out the ammonia with water, for instance as described in GB 2.067.175 A. The ammonia can be separated from the water by distillation. The main disadvantage of this method is that the gas mixture is moistened by the water. The result of this is that the gas mixture has to be dried subsequent to the ammonia removal to avoid deactivation of the catalyst. A molecular sieve is used for removing water from the gas mixture.

Another disadvantage of this type of process is that the heat of absorption and heat of desorption for ammonia in water is high. The result of this is that a large amount of energy has to be supplied for separation of the ammonia from the water.

Further it is known from DE 19 24 892 to remove ammonia from partly converted synthesis gas by absorption in a solvent, for instance ethylene glycol. The solvent can be regenerated by heating with steam. Desorption is carried out in a column having a lower pressure.

The disadvantage of this method is that desorption is carried out under such low pressure that the cooling water can not be used in the subsequent condensation of ammonia. Ammonia must therefore be compressed or re-absorbed in order to get liquid ammonia, and this is expensive.

Another problem with this method is that the desorption temperature when using glycol has an upper limit of 170° C. because of the danger of decomposition. If high is applied pressure during the desorption such that it is possible to use cooling water for condensation of ammonia, the solvent will not be completely regenerated and accordingly part of the ammonia will be recirculated back to the synthesis.

SUMMARY OF THE INVENTION

The object of the present invention was to arrive at an economical way of removing as much as possible of the ammonia formed from unconverted synthesis gas in a gas mixture which shall be returned to the ammonia synthesis. It was especially desired to remove ammonia at conditions which make it possible to effectively utilize cooling water for condensation of ammonia.

The inventors aimed at purifying the gas mixture which should be returned to the ammonia synthesis to such a degree that the synthesis could be carried out at a relatively low pressure and without substantial deactivation of the catalyst. In order to obtain this it was expected that the concentration of ammonia in the gas mixture should be below 0.5 volume %.

It was found that if this goal should be attained, it would be quite expensive and energy consuming to separate all ammonia by condensation. It is known that the solubility of ammonia in water is very high, but also that it is uneconomical to wash out/absorb ammonia by water for instance because the gas mixture had to be dried for each circulation when extra water is brought into the gas mixture during the ammonia absorption stage. Removal of ammonia by some form of absorption is however considered as a possible method, and it will then be a question of finding an absorption agent which will result in a totally economical process. It was therefore attempted to define a suitable absorption agent and one arrived at the following requirements was determined for such agent:

high solubility for ammonia;
result in a simple and low energy consuming separation of the absorption agent and ammonia;
low volatility at the actual pressure and temperature;
it should not deactivate the catalyst, nor should it be poisonous with respect to health.
it has to be stable and not decompose;
corrosion problems should be as small as possible; and
its price should be as low as possible.

It was further important with regard to a most economical process that the following considerations were made:

the temperature in the absorption tower should be as low as it is possible to obtain by using cooling water;
the pressure in the desorption tower should be as low as possible, but still sufficiently high for utilizing cooling water in the condenser;
the temperature at the bottom of the desorption column should be as high as present low energy heat from other parts of the ammonia units allows, for instance 100° -150° C.; and
when ammonia is to be removed from the absorption agent, the highest possible temperature shall be applied in the desorption column without damaging (decomposing) the absorption agent in order to remove as much of the ammonia as possible in the desorption column.

Possible absorption agents and process conditions were then investigated within the above criteria for the absorption agent and process. Separation of ammonia from other gas mixtures was also investigated in order to find out whether agents used or process conditions could be applied for solving the actual problems.

Organic absorption agents having two or more OH-groups, for instance glycol, seemed in the beginning to meet at least some of the above requirements. Despite the disadvantages which the process according to the above mentioned DE 1924892 has, the inventors still found that they would try to use this type of absorption agent, but then alter the process to utilize low value process heat and cooling water present.

Further investigations of suitable absorption agents within the above mentioned type showed that, first of all, high boiling glycol, especially diethylene glycol, could be applicable.

The inventors then studied how to carry out the absorption and desorption with regard to utilization of cooling water. It was then found that by carrying out the absorption at a pressure which is substantially the same as the pressure of the ammonia synthesis and then desorbing ammonia from the desorption agent in at least two stages, one would be able to utilize cooling water in an economical way. It was then also possible to remove ammonia efficiently so that the gas mixture returned to the synthesis contained less than 0.5 volume % ammonia. It was further found that it was most practical to desorb the main part of the ammonia in the first stage at 7-20 bar, condense with cooling water at a temperature of 5°-35° C., then in a subsequent stage desorb ammonia at a pressure of 1-3 bar. Energy could be saved by using further desorption stages at 3-15 bar.

The water which can be present in the gas mixture originates mainly from the methanation step. This water can be removed in several ways known per se and at different places in the process. Thus it can for instance be removed ahead of the absorption column by means of glycol or from the absorption agent ahead of the desorption column. But it can also be removed from the purified extractant before it is returned to the absorption column.

The invention will now be further explained in connection with the description of the figures and the examples.

DETAILED DESCRIPTION OF THE INVENTION

Figure 1:
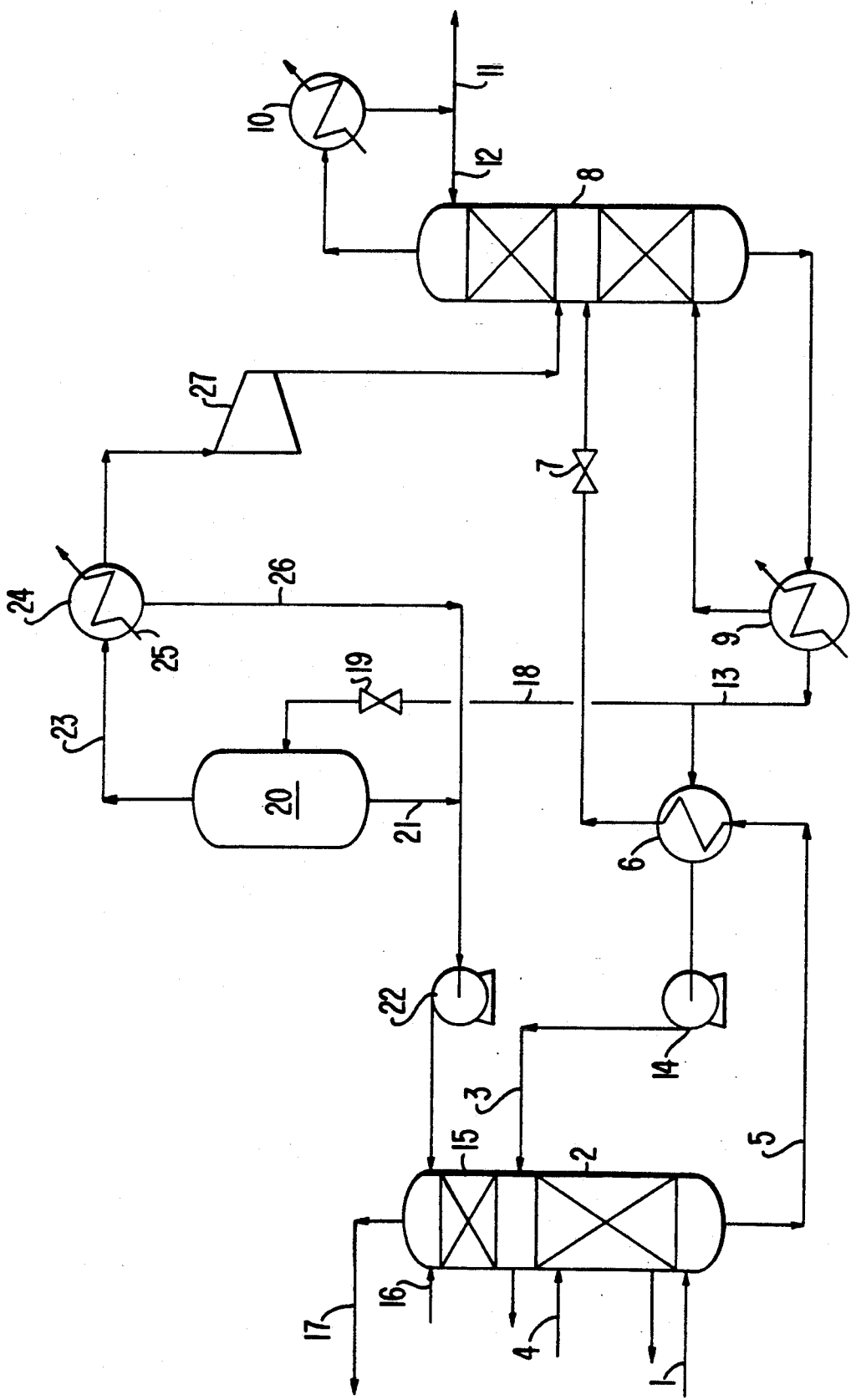
FIG. 1 shows a flow-sheet for removal of ammonia from a partly converted synthesis gas from an ammonia reactor.

In FIG. 1 is shown the gas mixture 1 which shall be freed of its ammonia content as much as possible and the purified synthesis gas mixture 17 which is transferred back to the ammonia reactor (not shown). Completely regenerated absorption agent 21 is supplied to the absorption column 2 via pump 22, and partly regenerated absorption agent 13 is supplied through pipe 3 via pump 14. The temperature in the column 2 is regulated by means of cooling water 4. The upper part 15 of the column is cooled by cooling water 16. The absorption agent containing absorbed ammonia is transferred out of the bottom of the column 2 through pipe 5 through the heat exchanger 6 and the pressure reduction valve 7 to the desorption column 8. Ammonia 11 is removed from the top of the column 8, while some of the ammonia is condensed in cooler 10 where some inert gas can also be removed. Ammonia is transferred in reflux via pipe 12 back to the top of the column 2. The liquid from the column 8 is heated in heat exchanger 9 and the gas is returned to column 8. The liquid from the heat exchanger 9 is partly regenerated absorption agent 13. The main part of the absorption agent 13 is transferred in pipe 3 through heat exchanger 6 back to the absorption column 2.

Some of the partly regenerated absorption agent 13 is transferred through pipe 18 and reduction valve 19 to a separating tank 20. The absorption agent is regenerated there. The regenerated absorption agent 21 is returned to the absorption column 2. The desorbed ammonia 23 from the separation tank 20 is first cooled by cooling water 25 in the cooler 24. Condensed absorption agent 26 is transferred to pipe containing regenerated absorption agent 21. Desorbed ammonia 23 is compressed in compressor 27 and transferred to the desorption column 8.

Figure 2:
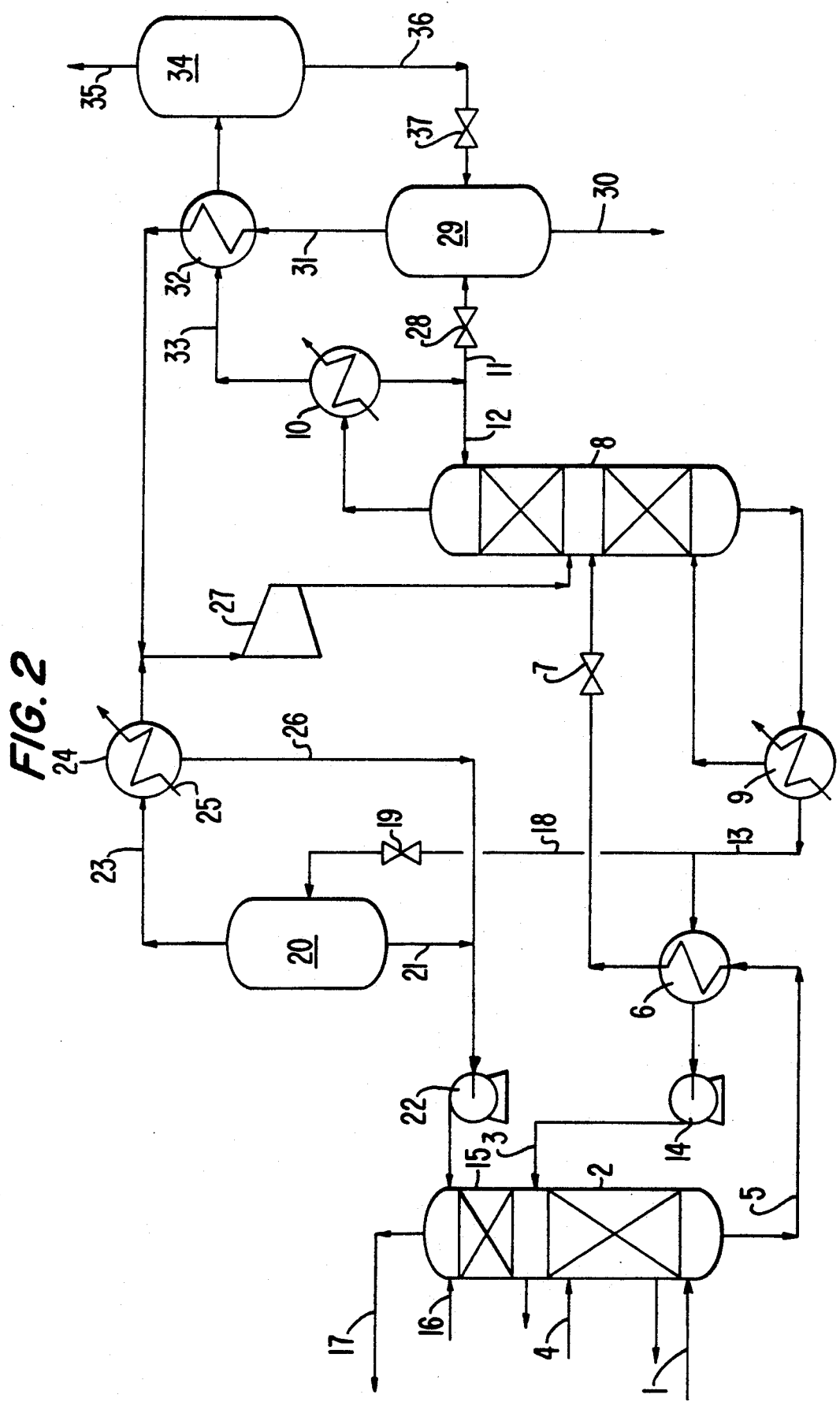
FIG. 2 shows a flow-sheet for removal of ammonia from a partly converted synthesis gas and where the ammonia is removed as a product at atmospheric pressure.

FIG. 2 shows an embodiment of the invention where ammonia finally is removed as liquid at atmospheric pressure. Ammonia from the top of the desorption column 8 is cooled and transferred by pipe 11 via pressure relief valve 28 to a separation tank 29. The liquid ammonia product 30 is removed at the bottom of the separation tank 29. Gaseous ammonia from the separation tank 29 is transferred in pipe 31 through heat exchanger 32 to the compressor 27. Non-condensed gas 33 from the cooler 10 is cooled in cooler 32 and transferred to separation tank 34. Inert gases are removed through pipe 35 and condensed liquid is transferred in pipe 36 to a reduction valve 37 to the separation tank 29. The remaining part of the process is as shown in FIG. 1.

Figure 3:
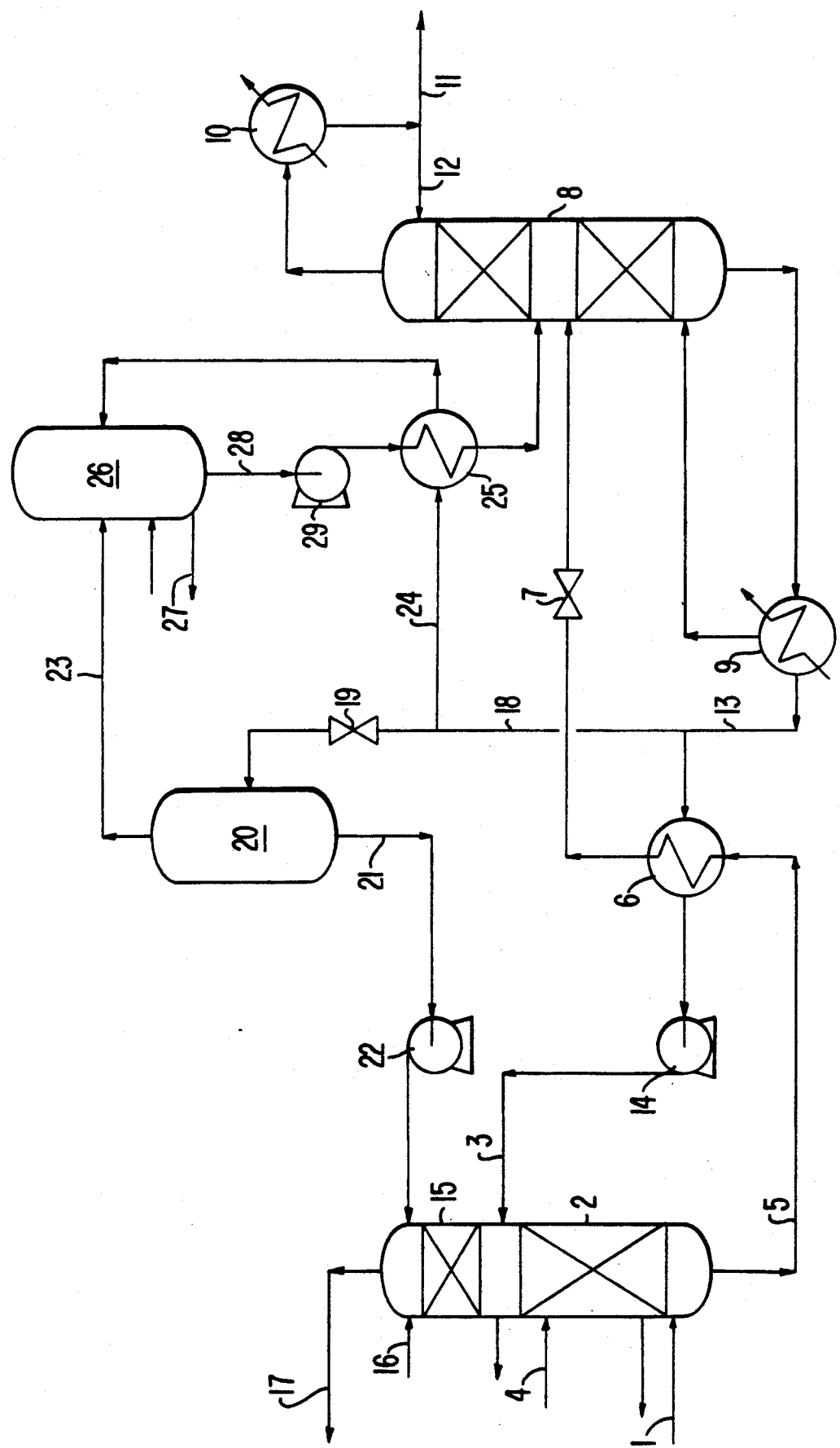
FIG. 3 shows a flow-sheet for removal of ammonia from partly converted synthesis gas and where the ammonia is removed as a liquid product at cooling water temperature.

FIG. 3 shows an alternative way of treating desorbed ammonia from separation tank 20. Ammonia is transferred to the absorption tank 26 and cooled by cooling water 27. The absorption agent is supplied through pipe 24 and is cooled in cooler 25. The liquid 28 from the absorption tank 26 is pumped back to the desorption tower 8 via pump 29 and heat exchanger 25.

EXAMPLE 1

This example shows the method according to the invention carried out in a unit as described in FIG. 1.

Gas mixture 1 at 25° C., 50 bar and containing 10 volume % $NH_3$ is contacted by the ethylene glycol containing some ammonia in column 2. Regenerated absorption agent (0.8 weight % $NH_3$) 21 is supplied to the top of the column, and partly regenerated absorption agent 13 (6.8 weight % $NH_3$) is supplied at the center of column 2. Cooling water 4 and 16 ensure that the temperature in the absorption tower is kept at about 25° C. The ammonia content of the liquid at the bottom of the tower 5 became about 16 weight %.

The stream 5 from column 2 is warmed in heat exchanger 6, and the pressure is relieved in valve 7 to 11 bar and then to stream 5 is transferred to desorption column 8. Liquid at the bottom of the column is heated in the boiler 9 at about 130° C. Ammonia at the top of the desorption column 8 is condensed in condenser 10 at about 25° C. Inert gas can also be removed in the condenser. Some of the ammonia is returned to the absorption column as reflux and the rest is product ammonia at 25° C.

The liquid stream 13 from the boiler 9 contains 6.8 weight 5 ammonia. The stream 3 is cooled in the heat exchanger 6 and pumped by pump 14 back to the center of the absorption column 2.

The liquid stream 18 from the boiler is pressure relieved by valve 19 to 1 bar and transferred to the desorption tank 20. Ammonia 23 from the top of the desorption tank 20 is cooled in cooler 24 at about 25° C., compressed to 11 bar and transferred to desorption column 8. Condensate 26 from cooler 24 is transferred together with the liquid stream from the desorption tank 20. Liquid from the desorption tank 20 containing about 0.8 weight % ammonia is pumped by the pump 22 to the top of the absorption colum 2.

The ammonia concentration at the top of the absorption column becomes 0.5 volume %. This means that about 95% of the ammonia in the stream 1 is absorbed and is removed as product 11.

EXAMPLE 2

This example shows the method according to the invention carried out in a unit as described in FIG. 2.

The liquid ammonia stream 11 from Example 1 is at 25° C. By this process the pressure of the stream 11 is reduced to 1 bar in valve 28 and the liquid is transferred to separation tank 29. The temperature in the tank 29 will then be $-33°$ C. The ammonia gas from the separation tank 29 is heated in heat exchanger 32 and transferred together with the stream 23 to the compressor 27. Non-condensed gas from cooler 10 is cooled in the heat exchanger 32 and transferred to separation tank 34. The gas stream 35 from the separation tank 34 contains minor amounts of nitrogen, methane and argon. Condensed liquid from separation tank 34 is expanded in the valve 37 and transferred to separation tank 29. The ammonia product 30 will be a liquid at $-33°$ C. The ammonia concentration in the gas mixture returned to the synthesis was 0.5 volume %. This means that about 95% of the ammonia in the gas mixture from the synthesis was absorbed and removed as a product 30.

EXAMPLE 3

This Example shows the method according to the invention carried out in a unit as described in FIG. 3. The difference between this method and that of Example 1 is found in the way the ammonia gas is transferred back to the process.

The method is the same as in Example 1 except that the boiler 9 is operated at about 105° C. such that partly regenerated diethylene glycol contains about 5.3 weight % $NH_3$. From the separation tank 20, the ammonia gas 23 is transferred to the absorption tank 26. Partly regenerated diethylene glycol 24 is cooled in the heat exchanger 25 and transferred to the absorption tank 26. The absorption tank 26 is cooled by cooling water 27 such the temperature is kept at about 25° C. Liquid 28 from the absorption tank 26 containing about 8.5 weight % $NH_3$ is pumped up to 11 bar by pump 29, heated in the heat exchanger 25 and transferred to the absorption column 8.

This way of carrying out the method results in removal of 98% of the ammonia in the gas mixture from the synthesis by absorption and the ammonia is removed as product 11. The ammonia concentration in the gas mixture returned to the synthesis was 0.2 volume %.

By the present invention, one can in a simple and economical way remove at least 95% of the ammonia in the synthesis gas mixture before it is returned to the ammonia reactor, this means that the gas mixture would contain less than 0.5 volume % ammonia. Further, water present in the gas mixture can be reduced to about 1 ppm. The consequence of these measures is that such a pure synthesis gas is supplied to the reactor that the ammonia synthesis can be carried out in an economical way at substantially lower pressure than previously has been possible by known techniques.

A by-effect of the method according to the invention is that processing of the purged gas (inert gas removal) can be carried out in a simpler way than usual because the ammonia content is low. The method will further be suitable if it is desired to bring the water content below 1 ppm in the gas mixture before it is returned to the ammonia synthesis.

We claim:

1. In a method for removal of ammonia from a gas mixture formed in an ammonia synthesis process by catalytic production of ammonia, wherein the gas mixture comprises unconverted synthesis gas, ammonia, and inert gases, and wherein the gas mixture is freed from ammonia by absorption with an organic absorption agent having two or more OH-groups, the ammonia is subsequently desorbed from the absorption agent, and the resultant gas mixture is then returned to the ammonia synthesis process, the improvement comprising:

carrying out the absorption at a pressure which is substantially the same as the pressure of the ammonia synthesis process; and carrying out the desorption of the ammonia from the absorption agent in at least two stages, including a first desorption stage in which a major portion of the ammonia is desorbed at a pressure of 7-20 bare and condensed by cooling water at a temperature of 5°-35° C., and a second desorption stage in which further amounts of ammonia are desorbed from the absorption agent at a pressure of 1-3 bar.

2. A method according to claim 1, wherein the desorption is carried out during heating by process heat at a temperature of 100°-150 C.

3. A method according to claim 1, wherein ammonia desorbed in the second desorption stage is compressed and returned to the first desorption stage.

4. A method according to claim 1, wherein the ammonia desorbed in the second desorption stage is reabsorbed and pumped back to the first desorption stage.

5. A method according to claim 1, wherein the ammonia desorbed in the second desorption stage is first brought in contact with volatilized ammonia formed after expansion of condensed ammonia removed in the first desorption stage, and then the combined ammonia streams are compressed and returned to the first desorption stage.

6. A method according to claim 1, wherein the absorption agent used in carrying out the absorption comprises ethylene glycol.

7. A method according to claim 1, wherein said at least two stages of said desorption further include a third desorption stage in which additional amounts of ammonia are desorbed from the desorption agent at a pressure of 3-15 bar.

8. A method according to claim 1, wherein cooling water used for desorption in the first desorption stage is subsequently used a the cooling water for condensing the ammonia desorbed in the first desorption stage.

* * * * *